April 14, 1931.  R. A. SHIPLEY  1,800,324
APPARATUS AND METHOD FOR MAKING CLOSED TILE
Filed Aug. 30, 1927  4 Sheets-Sheet 1
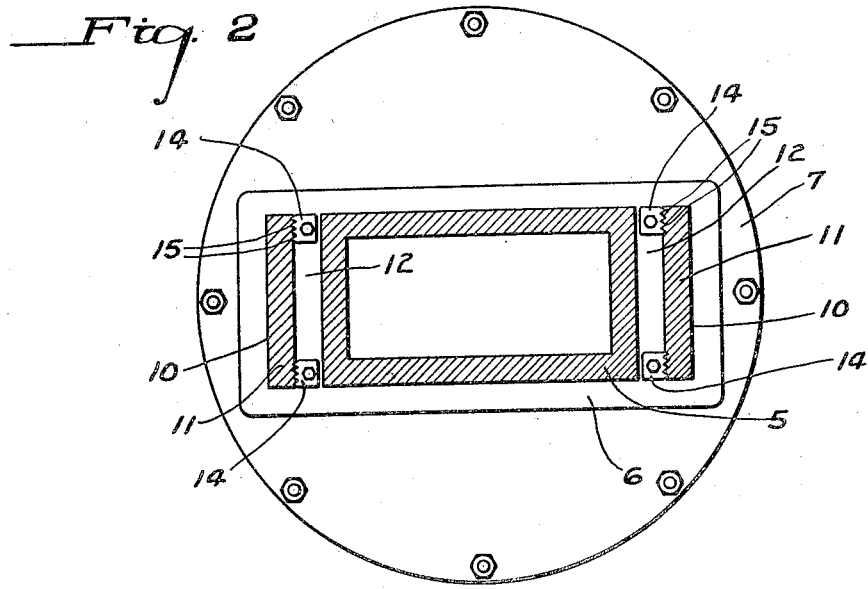
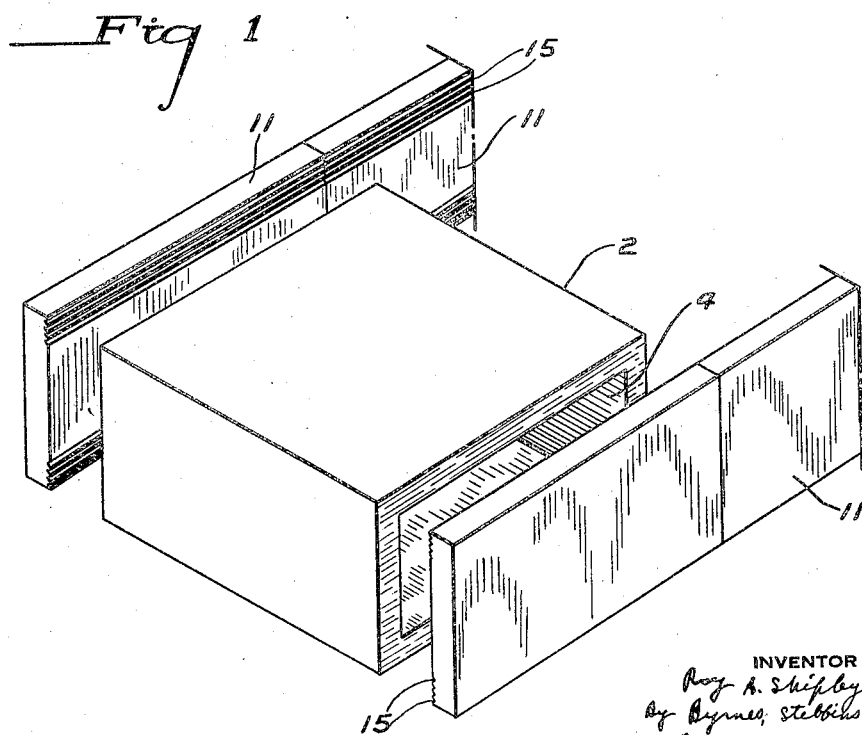

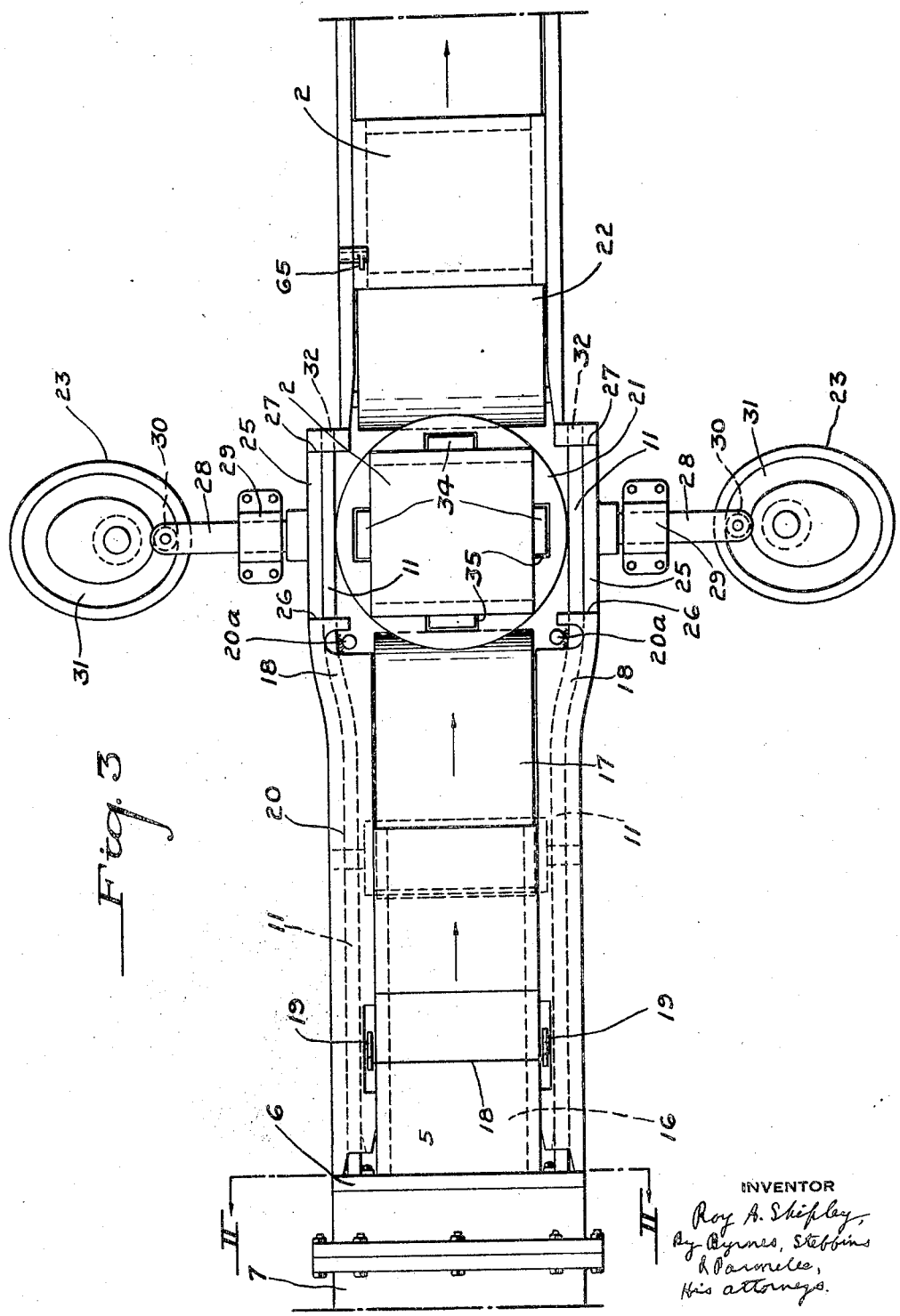

April 14, 1931.    R. A. SHIPLEY    1,800,324
APPARATUS AND METHOD FOR MAKING CLOSED TILE
Filed Aug. 30, 1927    4 Sheets-Sheet 3

INVENTOR
Roy A. Shipley,
By Byrnes, Stebbins
& Parmelee,
His attorneys.

April 14, 1931.    R. A. SHIPLEY    1,800,324
APPARATUS AND METHOD FOR MAKING CLOSED TILE
Filed Aug. 30, 1927    4 Sheets-Sheet 4

INVENTOR
Roy A. Shipley,
By Byrnes, Stebbins
& Parmelee,
His attorneys.

Patented Apr. 14, 1931

1,800,324

UNITED STATES PATENT OFFICE

ROY A. SHIPLEY, OF CANTON, OHIO, ASSIGNOR, BY MESNE ASSIGNMENTS, TO NATIONAL FIREPROOFING CORPORATION, OF PITTSBURGH, PENNSYLVANIA, A CORPORATION OF PENNSYLVANIA

APPARATUS AND METHOD FOR MAKING CLOSED TILE

Application filed August 30, 1927. Serial No. 216,373.

My invention relates to enclosed hollow tile and to apparatus and methods for making the same.

In using hollow tile as a form for pouring cement beams in floors and the like, it is desirable that the ends of the tiles be closed. Where open ended tiles are used, a large amount of the concrete while in the plastic state flows into the open ends of the tile and is wasted. The excess concrete also adds a considerable dead weight to the floor that must be supported by the beams. In my copending application, Serial No. 204,485, filed July 9, 1927, I have shown and described a method and apparatus for enclosing one end of a hollow tile by a molding operation. In my copending application Serial No. 323,318, which is a division of this application, I have shown, described and claimed a conveyor and turntable structure adapted for use with the present invention.

By the method and apparatus herein described, I form hollow tile with closed ends by utilizing a commercial form of molding machinery for shaping a continuous hollow tile body. Preferably the tile body is extruded and placed on a conveyor. After the body is cut into sections, the conveyor turns the tile sections into position to have their ends closed by pieces cut from continuously moving strips of material. These strips are preferably extruded from the same die and simultaneously with the body of the tile. The tile body may be cut into sections either before or after it is placed upon the conveyor.

The conveyor comprises a plurality of successive sections moving at different rates of speed, between which a turn table is disposed. The successive sections of the conveyor move at increasing rates of speed in order that tile sections may be halted on the turn table for a sufficient length of time to close their ends and remove them from the turn table without interfering with the continuous extruding operation of the die. For closing the ends of the tile sections, the turn table turns the sections sufficiently to present their open ends at the sides of the conveyor. While in their turned position, cutters are moved to cut sections from the flanking strips and press them on to the ends of the tile sections. The ends of the tile sections are moistened previous to the reception of the closing strips. After the ends of the tile are closed, the tile is pushed on to a section of the conveyor beyond the turn table, moving at a high enough rate of speed to withdraw the finished tile from the turn table before another section of tile is placed thereon.

A system of stops and electrical contacts is provided for halting the movement of the tile sections as they are fed to the turn table. The stops also control, preferably through electromagnet means, a clutch mechanism for turning the turn table. The control system includes means for selectively depressing the stops to permit the finished tile to move off the turn table at the end of the closing operation and to stop oncoming tile. By utilizing a system of electrical control, the foregoing operations may be conducted at relatively high speed and changes may readily be made in the settings of the constituent parts of the device.

In the accompanying drawings, which illustrate a present preferred embodiment of my invention, Fig. 1 is a perspective view showing the relative positions of the component parts of the tile before they are brought into engagement;

Fig. 2 is an end view of a die for shaping the parts shown in Fig. 1;

Fig. 3 is a plan view of a conveyor embodying my invention;

Figure 4:
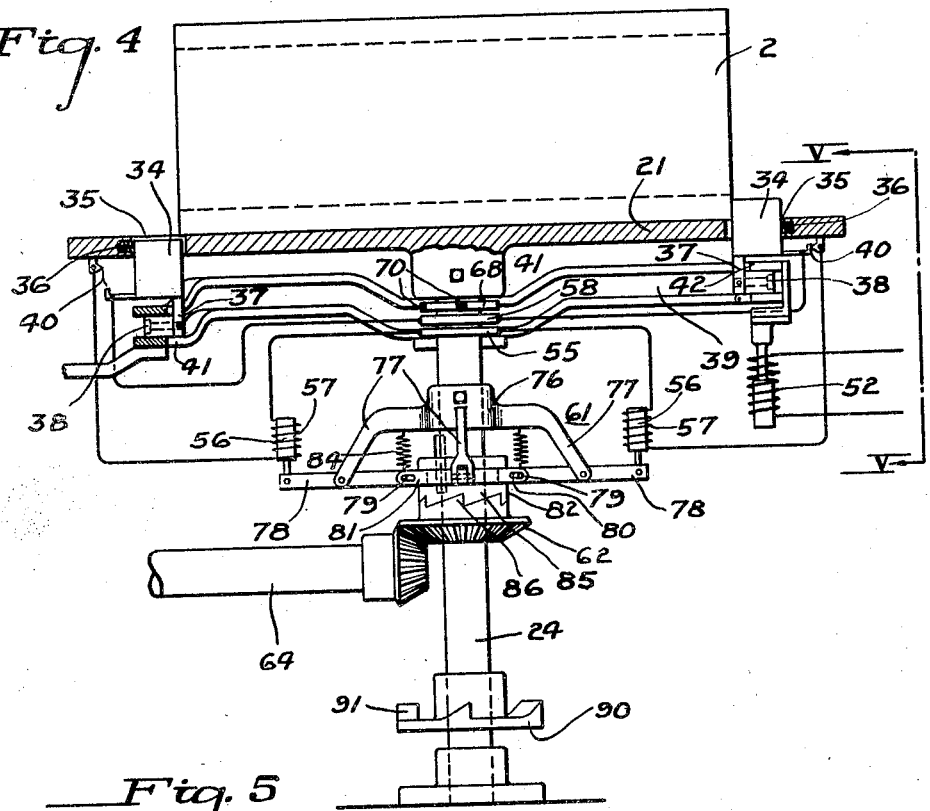
Fig. 4 is a view, partially in elevation and partially in section of the turn table embodied in the conveyor.

Referring to Figs. 1 and 2, a hollow tile 2 having open ends 4 is formed by cutting a body 5 of ceramic material extruded from a die 6 into sections. The die 6 is of well known form and is placed on the end of an auger machine 7 adapted to extruded material and form a continuous box-like body. At each end of the die 6 openings 10 are provided for forming strips or slabs 11 of the same material as the body 5. The strips 11 are spaced from the body portion 5 by walls 12. The walls 12 may be provided with fluted plates 14 for scoring flutes 15 along the inner edges of the strips 11. The auger machine 7 is operated continuously and at a rate of speed dependent upon the constituency and thickness of the walls of the tile. As the body portion 5 is extruded from the die 6 with its open ends at right angles to the strips 11, it is necessary that the sections 2 be turned through substantially a right angle before the sections of the strips are applied to the open ends 4.

Referring to Fig. 3, as the body 5 is extruded from the die 6, it passes over a plate 16 carried by the machine 7 on to a conveyor 17. The conveyor 17 may be in the form of a belt. The rate of speed of the conveyor 17 is in excess of the rate at which the body 5 moves across the plate 16 in order that sections of the body 5 reaching the conveyor 17 may be speeded up sufficiently to permit the turning and closing operation while permitting a continuous extruding operation from the die 6. The body 5 is cut into sections by a wire 18, preferably supported by arms 19 mounted on the plate 16. The arms 19 are operated by any suitable mechanism, not shown. The cutting wire 18 may be disposed so as to separate the sections to form the body 5 after they are in engagement with the conveyor 17, if desired. However, in locating the wire 18 to cut the body 5 into sections after the former is in engagement with the conveyor 17, care must be exercised to prevent the roughening of the surfaces of the sections 2 by reason of slippage.

The strips 11 are fed through guideways 20 extending parallel to and in spaced relation with the edges of the plate 16 and conveyor 17. Near the ends of the conveyor 17, the guideways 20 are flared outwardly to clear the edges of the turn table 21. Sprays 20a are located in the flared portions of the guideways 20 for a purpose hereinafter more fully described.

The turn table 21 delivers the tile sections 2 to a conveyor 22 operating at a materially higher rate of speed than the conveyor 17 in order to withdraw finished tiles from the turn table 21 faster than they are fed onto it. The movement of the material from the auger machine 7 along the conveyor first takes place over the plate 16 where the body 5 is cut into the sections 2, that are moved by the conveyor 17 onto the turn table 21 at a high enough rate of speed to permit the turn table 21 to be moved through substantially 90° and the ends of the sections 2 closed by strips cut from the slabs or strips 11. Thereafter the finished tiles are removed from the turn table 21 by the combined action of oncoming tile sections and the conveyor 22, the latter operating at a substantially higher rate of speed than the conveyor 17. The difference in the speed of the conveyors 17 and 22 permits a stop mechanism, hereinafter described, to be brought to position to intercept the oncoming tile section after the finished section is discharged from the turn table 21.

Referring to Figs. 3 to 6, for closing ends 4 of the sections 2, cams 23 are mounted at the sides of the conveyor substantially in alinement with the axis of the turn table 21. The cams 23 are turned in synchronism with a drive shaft 24 for the turn table 21. Each cam 23 actuates a cutting plate 25 having a reciprocating movement between faces 26 and 27 formed in the guideways 20. Each plate 25 is connected to its corresponding cam 23 by a rod 28 extending through a bearing 29, and a roller 30 disposed in a groove 31 in the cam 23. The travel of the plates 25 is such that they are entirely withdrawn from the passageways in the guideways 20 when in their restricted position, in order that the strips 11 may move across the opening between the faces 26 and 27. By providing cutting surfaces at both ends of the plates 25, the strips 11 are cut into sections, the ends of which are regular and even. The material severed along the faces 27 and remaining in the guideways 20 is discharged through openings 32.

As the strips 11 are continuously extruded from the die 6, simultaneously with the body portion 5, the natural rate of movement of the strips 11 through the guideways 20 is the same as that of the body portion 5 along the plate 16. But since the sections 2 are speeded up during their travel over the conveyor 17 and as an appreciable delay occurs while the sections 2 are being turned by the turn table 21, enough material traverses the openings between the faces 26 and 27 to provide end strips for the tile sections 2 providing that the width of the tile is less than its length when severed by the wire 18. In the event that the width of the tile is substantially equal to or greater than its length, provision must be made for increasing the speed of the strips 11 through the guideways 20. This may be accomplished by extruding the strips 11 through dies separated from the die 6.

As the tile sections 2 are received on the turn table 21 they move forward until they engage one of a number of stops 34 by which they are halted. Each stop 34 extends upwardly through an opening 35 in the turn table 21 and is biased to an inner position by a spring 36. Each stop 34 has an individual lug 37 carrying a roller 38 travelling in a stationary cam 39. By this construction the position of the stop 34 is controlled by its position along the cam 39. Each stop 34 is provided with a switch 40 normally held in open position by the spring 36.

Cam 39 is provided with three rigid depressed portions 41 and a flexible portion 42. The depressed portions 41 are disposed so as to insure that the stops 34 are repressed at three points around its circumference. The depressed points are opposite the cams 23 and on the center line of the conveyor 17 for permitting the sections of the strips 11 to pass thereover and for permitting the oncoming tile sections 2 to move on to the turn table 21, respectively.

Figure 5:
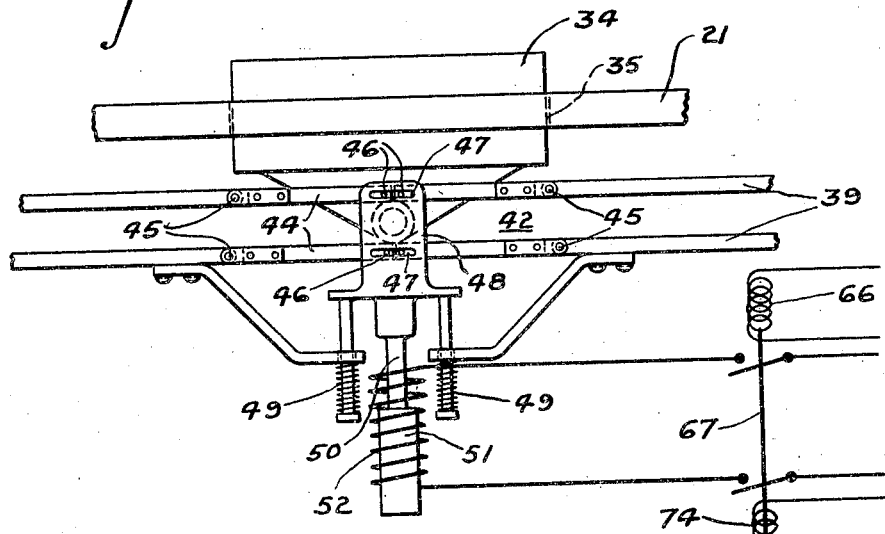
Fig. 5 is an edge view of a portion of the turn table taken along the line V—V of Fig. 4.

Referring to Fig. 5, the flexible section 42 is constituted by bars 44 secured by hinges 45 to the sides of the cam 39. The bars 44 are provided with pins 46 at their outer ends. The pins 46 are disposed in slots 47 in a yoke 48. Springs 49 normally bias the yoke 48 in a downwardly position. An armature 50 of an electromagnet 51 is attached to the bottom of the yoke 48. Upon the energization of the winding 52 of electromagnet 51, the yoke 48 is raised to lift the bars 44 into the plane of the sides of the cam 39, thereby raising the stop 34 above the surface of the turn table 21. The cam section 42 is disposed to intercept the oncoming tile section 2 at the rear of the turn table 21 and stop it preparatory to the turning movement. The cam section 42 is in its raised position only for a short period of time while halting the oncoming tile sections 2. During the remainder of the time, the stop 34, temporarily located thereat, is in a depressed position.

Figure 7:
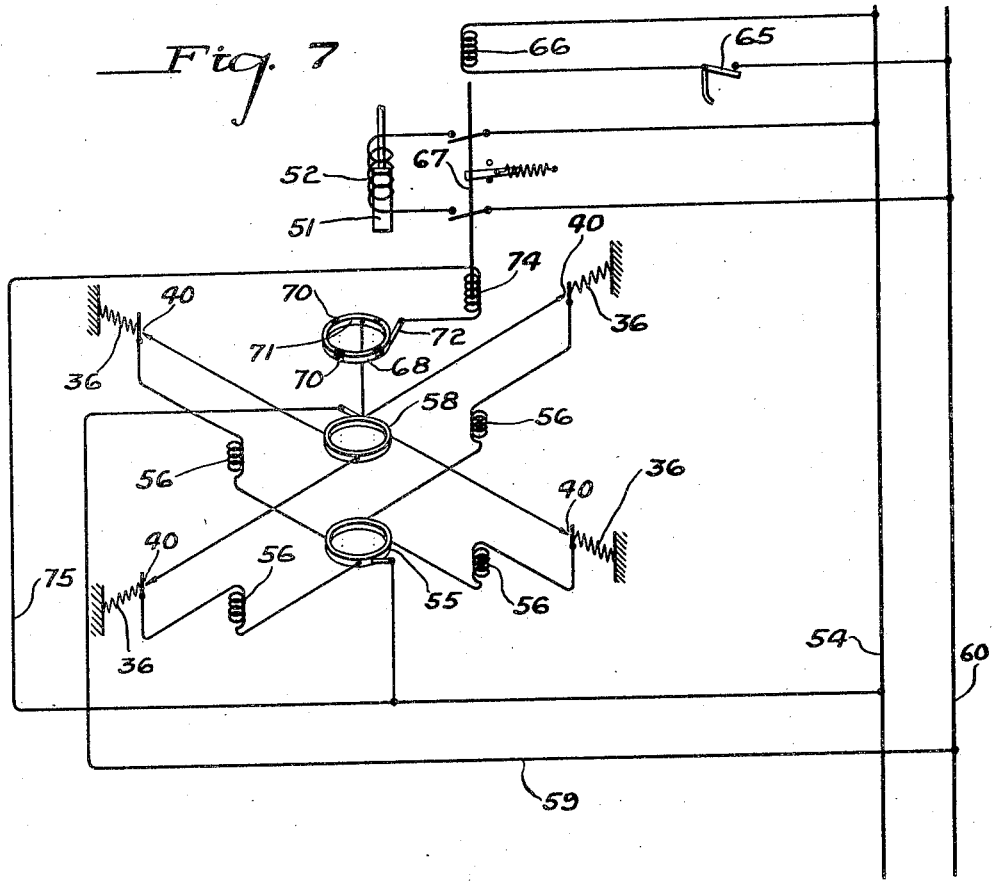
Fig. 7 is a diagrammatic view of circuits and apparatus illustrating the control circuits for the machine.

Referring to Figs. 4, 5 and 7, as soon as any stop 34 is pressed backwardly against its associated spring 36, the associated switch 40 is closed. The closing of the switch 40 completes a circuit from a supply conductor 54, through a slip ring 55 carried by the shaft 24 of the turn table, the winding 56 of an electromagnet 57, the switch 40 to a second slip ring 58 on the shaft 24 and a conductor 59 to another conductor 60 of the supply circuit. The energization of any electromagnet 57 causes a clutch 61, carried by the shaft 24, to engage a bevelled gear 62 driven by a shaft 64 for turning the turn table 21.

The oncoming tile section 2 to the turn table 21 crowds the finished tile section 2 on to the conveyor 22. Movement of the tile section 2 along the conveyor 22 closes a switch 65, switch 65 is in circuit with an electromagnet 66, for closing a switch 67 connecting the winding 52 to the supply conductors 54 and 60. Immediately upon the energization of the electromagnet 52, the stop 34 disposed in the flexible section 42 of the cam is raised to stop the oncoming tile section. Upon the closing of the switch 40 by the oncoming tile section, a circuit is completed for energizing the slip ring 58 as heretofore described.

When the slip ring 58 is energized, a slip ring 68 having a plurality of insulating sections 70 along its outer face and a continuous conductor 71 along its inner face is energized. A brush 72 bears against the outer surface of the slip ring 68 and is connected to an electromagnet 74, the other end of which is connected by a conductor 75 to the supply conductor 60. Accordingly, the brush 72 completes a circuit through the slip ring 68 to the conductors 54 and 60. When the brush 72 is opposite the insulating sections 70 of the slip ring 68, the circuit is open. The closing of the circuit through the electromagnet 74 opens the switch 67, thereby deenergizing the electromagnet 52 and permitting the yoke 48 to return to its lower position under the influence of the springs 49. The insulated sections 70 are disposed around the shaft 24 so as to be opposite the brush 72 during the periods when any stop 34 is required for stopping the movement of a tile section 2 moving onto the turn table 21.

Figure 6:
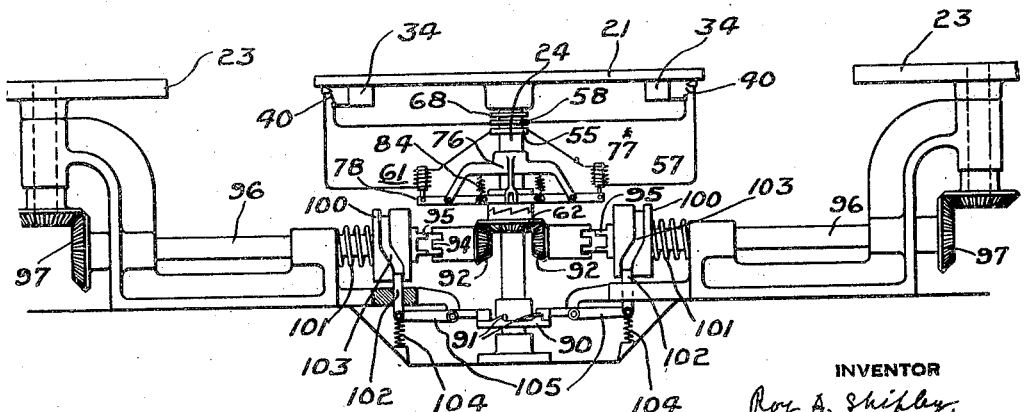
Fig. 6 is an elevational view of the clutch mechanism.

Referring to Figs. 4 and 6, the clutch 61 is constituted by a hub 76 mounted on the shaft 24 and having four outwardly extending arms 77, the lower end of each of which pivotally supports a lever 78. The outer end of each lever 78 is connected to the armature of one of the electromagnets 57. The inner end of each lever 78 is provided with a pin 79 extending through a slot 80 in a lug 81 extending outwardly from a clutch member 82 that is movable longitudinally of the shaft 24. The clutch member 82 is keyed to shaft 24 and is normally biased to a raised position by springs 84. The lower face of the clutch member 82 is provided with teeth 85 for engaging teeth 86 on the bevelled gear 62.

By this construction the clutch member 82 is normally held out of engagement with the gear 62 by the action of the springs 84. However, upon energization of any electromagnet 57, the corresponding lever 78 is turned to depress the clutch member 82 and bring the teeth 85 and 86 into engagement whereupon the shaft 24 is turned during such period as the electromagnet 57 remains energized. As soon as the departing tile section 2 opens the switch 65 and the electromagnet 74 is energized to open the switch 67, the stop 34 opposite the cam section 42 is depressed and the associated switch 40 is opened, thereby deenergizing the winding 56 of the electromagnet 57 and releasing the clutch member 82 from engagement with gear 62 by the contraction of the springs 84. While I have shown the angular movement of the turn table 21 to be substantially 90° for each actuation of the clutch mechanism 61, it is to be understood that the angular movement of the turn table 21 may be varied if desired, since such angular movement may be controlled by the number of electromagnets 56 and switches 40 provided in the machine.

Referring to Fig. 6, for actuating the cams 23, the shaft 24 is provided with a collar 90 having a plurality of upwardly extending teeth 91 mounted thereon. The number of teeth 91 corresponds to the number of stops desired during each complete revolution of the turn table 21. Ears 92 are continuously driven by the gear 62 and are provided with teeth 94 engaging clutch teeth 95 for driving shafts 96 connected through intermediate gear 97 to the cams 23. The teeth 95 are carried on the shaft 96 by barrel cams 100 biased into engagement with the gears 92 by springs 101. Outward movement of the barrel cams 100 under the influence of springs 101 is resisted by pins 102 travelling in the grooves 103 of the barrel cams. The pins 102 are biased upwardly by coil springs 104. Levers 105 are pivotally mounted on the frame supporting the shafts 96. The inner ends of the levers 105 ride over the teeth 91 on the collar 90 and the outer ends are pivoted to the pins 102. During the turning movement of the shaft 24, the inner ends of the levers 105 ride upwardly on the teeth 91 which action withdraws the teeth 102 from engagement with the barrel cams 100. Upon the release of the barrel cams 100 they are moved inwardly by the expansion of the springs 101 and cause the teeth 94 and 95 to mesh, thereby imparting motion to the cams 23.

As the shaft 24 continues to turn the inner ends of the levers 105 drop over the top of the teeth 91, during which time the ends of the pins 102 ride on the outer face of the barrel cams 100. This condition continues until the barrel cams 100 have turned sufficiently to permit the pins 102 to reenter the grooves 103 under the expansive force of the springs 104. Continued turning movement of the barrel cams 100 causes the edges of the cams to bear against the edges of the pins 102 and move the barrel cams 100 outwardly out of engagement with the gears 92, whereupon movement of the shafts 96 and cams 23 is discontinued. The ratio between the gears 62 and 92 is such that a complete revolution of the cams 23 is had during each operation of the clutch mechanism 61. Since the shaft 24 only moves during the turning movement of the turn table 21, the barrel cams 100 are released only at the completion of each turning movement of the turn table 21 and, accordingly, the subsequential operation of the cams 23 insures that the plates 25, actuated by the cams 23 move forward to close the ends of the tile sections with strip sections 11 at the proper time.

After the ends 4 of the sections 2 are closed by the strips section 11, the oncoming tile section 2 engages the finished tile section 2 and moves it forwardly far enough for it to be seized by the conveyor 22. Since the conveyor section 22 moves at a higher rate of speed than the conveyor 17, the outgoing tile section is drawn away from the incoming tile section. As the outgoing tile section closes the switch 65, the stop 34 in front of the advancing tile section 2 is raised. Upon the engagement of the stop 34 by the oncoming tile section 2, the associated switch 40 is closed, which completes the circuits for actuating the clutch 61. Upon the actuation of clutch 61, the turn table 21 is turned the desired amount and the cams 23 are given a complete rotation, thereby causing the plates 25 to sever sections from the strips 11 and press them against the ends of the section 2. The ends of the sections 2 on the turn table 21 are moistened by the sprays 20a previous to the reception of the closing sections. The forgoing cycle of operations takes place automatically and continuously and at a rate of speed determined by the rate of extrusion from the auger machine 7.

It is to be understood that various changes may be made in the invention without departing from the scope of the appended claims.

I claim:

1. In the method of forming hollow tile, the steps consisting in producing a hollow body and a strip of the same material as the body, cutting the hollow body into tile sections, creating relative movement between the strip and tile section to expose an open end of each tile to the strip and applying a portion of the strip to an open end of each tile section.

2. In the method of forming hollow tile, the steps consisting in continuously extruding an open-ended tile blank, cutting the tile blank into sections, disposing the sections onto a conveyor, turning the sections at an angle to the direction of movement of the conveyor, and applying a closure member to one end of each section.

3. In a method of forming hollow tile, the steps consisting in disposing an open-ended tile on a conveyor with an open end facing longitudinally of the conveyor, turning the tile at an angle to the axis of the conveyor, and applying a closure member to an end of the tile.

4. In the method of forming hollow tile, the steps consisting in disposing an open-ended tile onto a conveyor with an open end facing longitudially of the conveyor, halting the tile, turning it at an angle to the conveyor, and applying a closure member to an end of the tile.

5. In the method of forming a hollow tile, the steps consisting in disposing an open-ended tile on a conveyor with an open end facing longitudially of the conveyor, turning the tile at an angle to the direction of movement of the conveyor, and simultaneously applying closure members to the ends of the tile.

6. In the method of forming hollow tile, the steps consisting in disposing an open-ended tile on a conveyor with an opening facing longitudinally of the conveyor, turning the tile at an angle to the conveyor, and applying a closure member to the end of the tile.

7. In the method of forming hollow tile, the steps consisting in extruding a hollow body and a strip of the same material as the body, cutting the hollow body into tile sections, placing the tile sections onto a conveyor, turning the tile sections at an angle to the direction of movement of the conveyor, and pressing a portion of the strip onto an open end of each tile section.

8. In the method of forming hollow tile, the steps consisting in placing a hollow body member and a strip of the same material at each side thereof for reception by a conveyor, cutting the hollow body into tile sections, creating relative movement between the strips and the tile sections to expose their open ends toward the strips, and applying portions of the strips to the ends thereof.

9. In the method of forming hollow tile, the steps consisting in depositing a hollow body member and a strip of the same material at each side thereof onto a conveyor, cutting the hollow body into tile sections, turning the tile sections to expose their open ends toward the sides of the conveyor, and pressing portions of the strips to the ends thereof.

10. In the method of forming a hollow device, the steps consisting in extruding a hollow body and a spaced strip from a die, sectioning the body and strip, relatively moving the successive sections and then applying a strip section to an end of each body section.

11. In the method of forming a hollow device, the steps consisting in extruding a hollow body and a spaced strip from a die, sectioning the body and strip, turning the successive body sections and then applying strip sections to the ends of the body sections.

12. In the method of forming a hollow body, the steps consisting in advancing the hollow body along a conveyor, turning the body at an angle to its direction of movement along the conveyor, and applying a closure member to an end of the body.

13. The combination with a die having openings for forming a hollow body and a strip of the same material, and a receiving conveyor, of means for sectioning the body, means for turning the successive sections at an angle to their direction of movement along the conveyor and means for applying a strip section to an end of each body section.

14. The combination with a die having openings for forming a hollow body and strips of the same material, and a receiving conveyor, of means for sectioning the body, means for turning the successive sections at an angle to their direction of movement along the conveyor and means for applying strip sections to the ends of each body section.

15. The combination with a die having openings for forming a hollow body and a strip of the same material as the body, and a receiving conveyor, of means for sectioning the body, means for turning the successive sections at an angle to their direction of movement along the conveyor, means for applying a strip section to an end of each body section, and means for subsequently conveying the assembled body and strip.

16. The combination with a die having openings for forming a hollow body and strips of the same material as the body, and a receiving conveyor, of means for sectioning the body, means for turning the successive sections at an angle to their direction of movement along the conveyor, means for applying the strip sections to the ends of each body section and means for subsequently conveying the assembled body and strips.

17. The combination with a die having openings for forming a tile body and a strip of the same material as the tile body, and a receiving conveyor, of means for sectioning the tile body, means for turning the successive bodies at an angle to their direction of movement along the conveyor, means for moistening an end thereof, and means for applying a strip section to the moistened end.

18. The combination with a die having openings for forming a tile body and strips of the same material as the tile body, and a receiving conveyor, of means for sectioning the tile body, means for turning the successive bodies at an angle to their direction of movement along the conveyor, means for moistening the ends thereof, and means for applying strip sections to the moistened ends.

19. The combination with means for forming hollow bodies and a strip of the same material, of means for moving successive bodies relatively to the strip, and means for applying a strip section to an end of each body.

20. The combination with a die having openings for forming hollow bodies and strips of the same material, of means for moving the successive bodies relatively to the strips, and means for applying strip sections to the ends of each body.

21. The combination with a die having openings for forming a continuous hollow body and a strip of the same material, of means for sectioning the body, means for moving the successive body sections relatively to the strip, and means for applying a strip section to an end of each body section.

22. The combination with a die having openings for forming a continuous hollow body and strips of the same material, of means for sectioning the body, means for moving the successive body sections relatively to the strips, and means for applying the strip sections to the ends of each body section.

23. In the method of forming hollow tile, the steps consisting in producing an open-ended tile section and a strip of material, creating relative movement between the strip and tile section to expose an open end of the tile to the strip and applying a portion of the strip to the end of the tile section.

In testimony whereof I have hereunto set my hand.

ROY A. SHIPLEY.